(No Model.)
J. C. BAYLES.
FLEXIBLE PIPE JOINT.
No. 582,575.  Patented May 11, 1897.
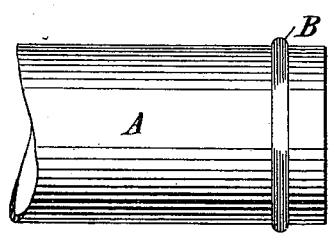
Fig. 1
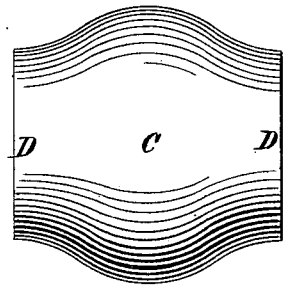
Fig. 2
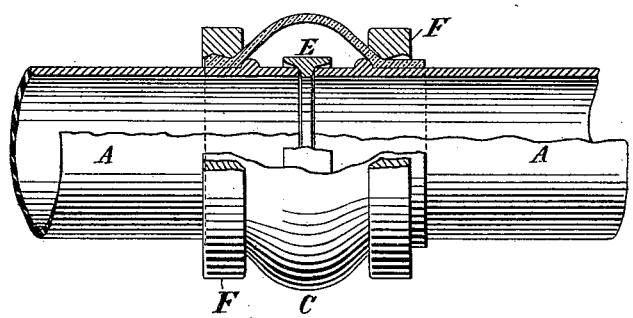
Fig. 4
Fig. 3
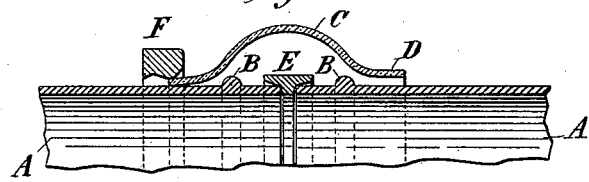
Fig. 5
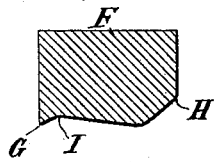
Witnesses:
Raphaël Netter
Jessie B. Kay
Inventor
James C. Bayles
by Robt. F. Gaylord, Atty.

UNITED STATES PATENT OFFICE.

JAMES C. BAYLES, OF EAST ORANGE, NEW JERSEY, ASSIGNOR TO LEWIS C. BAYLES, OF BRANFORD, CONNECTICUT.

FLEXIBLE PIPE-JOINT.

SPECIFICATION forming part of Letters Patent No. 582,575, dated May 11, 1897.

Application filed December 9, 1896. Serial No. 614,980. (No model.)

*To all whom it may concern:*

Be it known that I, JAMES C. BAYLES, a citizen of the United States, residing at East Orange, in the county of Essex and State of New Jersey, have invented a certain new and useful Improvement in Flexible Pipe-Joints, of which the following is a specification, reference being had to the drawings accompanying and forming a part of the same.

The invention relates generally to joining mechanism for flexibly connecting rigid pipe-sections. More particularly it relates to joints for flexibly connecting such sections when used for purposes of conveying fluids of low pressures, such, for instance, as illuminating-gases.

The object of the invention is to provide a yielding or flexible coupling or connection for rigid sections of pipe which shall act to hold joint-tight in spite of movement of the sections of the pipe-line when laid in the ground, whether due to unequal sinking, frost upheaval, lateral displacement, or changes of length by expansion and contraction, and this without developing leaks or constricting the main passage.

The invention consists generally in means for causing the ends of adjoining sections of pipe to abut or hold together to produce a practically uniform size of passage, whether in a straight or deviating line, also of a coupling-sleeve composed of a flexible, elastic, ductile, or readily-compressible metal, which sleeve laps the ends of the sections, and of means whereby the ends of said sleeve are pressed to and held sealed upon the ends of the sections, the sleeve being also shaped to act to sustain displacement without rupture as the sections are moved relatively.

Figure 1, in the accompanying drawings, is a side elevation view of one end of a rigid section of pipe constructed to coöperate with my flexible coupling-section. Fig. 2 is a side elevation view of the flexible coupling-sleeve or coupling-section. Fig. 3 shows in detail the two ends of adjacent coupled sections of pipe and my flexible coupling-sleeve, one end of the coupling-sleeve being shown as having been compressed to contact with one of the sections, while the other end is shown in normal size. Fig. 4 illustrates similar parts, one end of the coupling-ring being seated on the coupling-sleeve and calked, while the other end is seated but not calked. Fig. 5 illustrates on a larger scale a cross-section of one of the coupling-rings.

Referring to the views in detail, A represents one of the pipe-sections, which is provided near its end with an annular head, rib, or shoulder B, of circular or similarly beveled form, which preferably is cast or formed integral with the body of the pipe-section.

C indicates the flexible coupling-sleeve, which is to be composed of lead or any other suitably-ductile metal acting similarly to lead in capacity of compression, flexibility, or expansion, and there are various kinds of metals possessing these qualifications, though in general practice lead would be used.[1] The inside diameter of the ends D of this sleeve is such that they will readily pass over the shoulders or beads B on the ends of the pipe-sections, as seen at the right-hand side of Fig. 3. The main or body portion of this coupling-sleeve, between its two ends, is preferably of an essentially greater diameter than the diameter of its coupling ends or of the outside diameter of the rigid sections, as shown in Figs. 2, 3, and 4, this to insure against rupture by the various compressive and expansive actions this coupling is especially designed to meet.

E is an interiorly ribbed or finned collar or ring of size sufficient to receive the ends of the adjacent pipe-sections, as shown particularly in Figs. 3 and 4, and is adapted to center and hold the ends of the sections to prevent the lateral displacement of the same relatively or their becoming dislodged one from the other. In other words, this ring is in effect an articulate connection acting to hold the ends of the pipes in joint position, while yet permitting the sections to hinge on it.

F indicates the coupling-rings, the inner face of each of which is of form substantially as seen in Fig. 5, G being the outer edge of the same and H the inner edge, the smallest diameter of the inner face of this ring being slightly greater than the exterior diameter of the shoulders B on the ends of the pipe-sections.

In assembling the parts of this joint the coupling-rings are passed over the ends of the rigid pipe-sections to be joined together, and the coupling-sleeve is passed over the end of one of these sections after the ring thereon. Then the two sections are seated in the articulate collar. Then the coupling-sleeve is brought to position covering the ends of the two sections. Then each of the coupling-rings is brought to position so that its inner beveled face engages one of the ends of the coupling-sleeve, as seen at the left hand of Fig. 3. Then these coupling-rings are driven against the corresponding end of the coupling-sleeve, so as to contract the same in diameter and compress the material thereof against the beveled shoulder on that section of rigid pipe, as seen on the right-hand side of Fig. 4, thus forcing and locking the end of the sleeve tightly against the shoulder or rib on the end of that section of rigid pipe. After this the ends of the sleeve are calked, being driven into the recesses I in the faces of the coupling-rings, as seen on the left-hand side of Fig. 4, the overhanging edges G of the rings holding the calked portions in position, the rings being also thereby held to the pipe-sections and the coupling-sleeve being fixedly clamped between the rings and the beads on the ends of the sections, thus finally completing the joint.

The sealing of the joint is, however, mainly dependent upon the compression of the coupling-sleeve between the ribs on the ends of the sections and the beveled portions of the rings. There is therefore not the common necessity that complete calking should be effected, (and which is a considerable difficulty and an expense in time and labor,) especially as to the under side of a joint when the joint parts are assembled in a trench or ditch. If the coupling-sleeve is sufficiently compressed upon the pipe by the rings, and so as to prevent their slipping, the essential purpose of calking is accomplished, and it will be seen that such rings can be readily driven to seat without having to operate upon the same at their underneath side or at the bottom of the trench side of the pipe-main.

It will now be clear that such a joint, especially for gas-mains, will permit considerable deflection of the sections of the same relatively to each other, the bulbous coupling-sleeve accommodating itself to any movements thereof without unduly stretching or compressing and without tearing or otherwise rupturing.

The function of the articulate collar may be mechanically effected in other ways than herein illustrated, the essential purpose thereof being to hold the ends of the pipe-sections in practical concentric relation; and the shaping or the positioning of the ribs, shoulders, or beads on the ends of the pipe-sections may be varied to satisfy the conditions of manufacture or use of the same or the conditions incident to laying or joining varying sizes of rigid pipe-sections, their essential function being that of beveled shoulders or similar parts adapted to coöperate with the beveled coupling-rings to compress and seal the ends of the coupling-sleeve upon the pipe-sections.

It will be seen that a pipe-line consisting of rigid sections and of sections or joints such as are shown and described is, in essential effect, a conduit composed of alternate sections of rigid and of ductile or yielding material, constructed and applied to permit deviation of the main passage without constriction of the same, which sections are held together by beveled rings which compress the ductile material of one section against a coöperating beveled engaging part of a rigid section.

What is claimed as new is—

1. In combination with a rigid section of pipe, a bulbous flexible section of pipe of larger diameter than the outside diameter of the rigid section, composed of ductile or compressible material, and mechanism for compressing and sealing the uniting end of the flexible section to the rigid section, substantially as set forth.

2. In combination with a rigid pipe-section having a beveled annular shoulder or bead near its end, a flexible pipe-section of greater diameter, and a beveled coupling-ring adapted to compress and seal the end of the flexible section against the said shoulder of the rigid section.

3. In combination with a rigid pipe-section having a beveled annular shoulder or bead near its end, a connecting-section of ductile or compressive metal of substantially bulbous form, and a beveled coupling-ring adapted to coöperate with said shoulder to compress and seal the end of said connecting-section on said rigid section.

4. In combination with a rigid pipe-section having a beveled annular shoulder or bead near its end, a compressible or ductile metallic sleeve-section inclosing said end behind said shoulder, and a beveled coupling-ring inclosing the end of said sleeve and acting with said shoulder to compress and seal the end of said sleeve upon the said section, and also being provided with the calking-socket I.

5. In combination in a pipe-line, a series of rigid pipe-sections carrying annular beveled shoulders or ribs at their ends, and alternating flexible coupling sections or connections composed of yielding or ductile material, and a series of beveled coupling-rings acting to compress and seal the ends of the said flexible connections upon the said rigid sections and against the shoulders thereof.

6. In combination in a pipe-line, a series of rigid pipe-sections carrying annular beveled shoulders or ribs at their ends, and alternating bulbous sections or connections substantially as set forth, composed of yielding or ductile material, and a series of beveled coupling-rings acting to compress and seal the ends of the said connections upon the said rigid sections and against the shoulders thereof.

7. In combination with two rigid pipe-sections, means for holding their ends in articulate or flexible relation, an annular beveled shoulder or similar part on the end of each of said sections, a coupling-sleeve of ductile or compressible metal inclosing said ends and extending to behind said shoulders, and two beveled coupling-rings acting with said shoulders to engage the ends of the sleeve and to compress and hold the same sealed.

8. In combination with two pipe-sections each bearing near its end a projecting and beveled rib or bead, a coupling-sleeve of ductile or compressible metal inclosing said ends and extending to behind said ribs, and two coupling-rings beveled or inclined as to their inner faces and adapted to engage the ends of the said sleeve to compress the same upon the sections against said ribs, and an articulate collar E for holding the ends of the sections in flexible relation.

JAMES C. BAYLES.

Witnesses:
ROBT. F. GAYLORD,
JESSIE B. KAY.